(12) United States Patent
Min et al.

(10) Patent No.: US 9,825,278 B2
(45) Date of Patent: Nov. 21, 2017

(54) HIGH VOLTAGE BATTERY FOR VEHICLES

(71) Applicant: Hyundai Motor Company, Seoul (KR)

(72) Inventors: Hong Seok Min, Yongin-si (KR); Seung Ho Ahn, Seoul (KR); Sung Min Choi, Gyeongsangbuk-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 110 days.

(21) Appl. No.: 14/322,480

(22) Filed: Jul. 2, 2014

(65) Prior Publication Data

US 2015/0180014 A1 Jun. 25, 2015

(30) Foreign Application Priority Data

Dec. 19, 2013 (KR) .................. 10-2013-0159574

(51) Int. Cl.
*H01M 2/34* (2006.01)
*H01M 2/02* (2006.01)
*H01M 2/30* (2006.01)

(52) U.S. Cl.
CPC .......... *H01M 2/345* (2013.01); *H01M 2/0217* (2013.01); *H01M 2/305* (2013.01); *H01M 2200/20* (2013.01); *H01M 2220/20* (2013.01)

(58) Field of Classification Search
CPC .... H01M 2/34; H01M 2/345; H01M 2220/20; H01M 2200/20; H01M 2/0217; H01M 2/305
See application file for complete search history.

(56) References Cited

U.S. PATENT DOCUMENTS

2005/0069763 A1* 3/2005 Hong .................. H01M 2/0212
429/185

FOREIGN PATENT DOCUMENTS

| JP | 2013-041851 A | 2/2013 | |
|---|---|---|---|
| JP | 2013-118186 A | 6/2013 | |
| KR | 10-2004-0021144 A | 3/2004 | |
| KR | 2006-0000101 A | 1/2006 | |
| KR | 10-2009-0067580 A | 6/2009 | |
| KR | 10-2010-0038054 A | 4/2010 | |
| KR | 10-2011-0048470 A | 5/2011 | |
| KR | 10-1264534 A | 1/2013 | |
| KR | 10-2013-0090951 A | 8/2013 | |
| WO | WO-2013024963 | * 2/2013 | ............. H01M 2/10 |

OTHER PUBLICATIONS

Korean Notice of Allowance dated Jan. 12, 2015 issued in Korean Patent Application No. 10-2013-0159574 (English translation).

* cited by examiner

*Primary Examiner* — Jonathan G Leong
*Assistant Examiner* — Seenam Agbetiafan
(74) *Attorney, Agent, or Firm* — McDermott Will & Emery LLP

(57) ABSTRACT

A high voltage battery for vehicles includes an anode tab that is divided into a first part placed near a battery cell and a second part placed near a terminal. A first part extension extends from the first part and is fixed to a lower pouch. A second part extension extends from the second part, comes into contact with the first part extension, and is fixed at an upper end thereof to an upper pouch. An cathode extension extends from a cathode tab and is spaced apart from the upper end of the second part extension. A cushion is interposed between the second part extension and the cathode extension, with a reference level of pressure formed in the cushion.

11 Claims, 2 Drawing Sheets

[FIG.1]
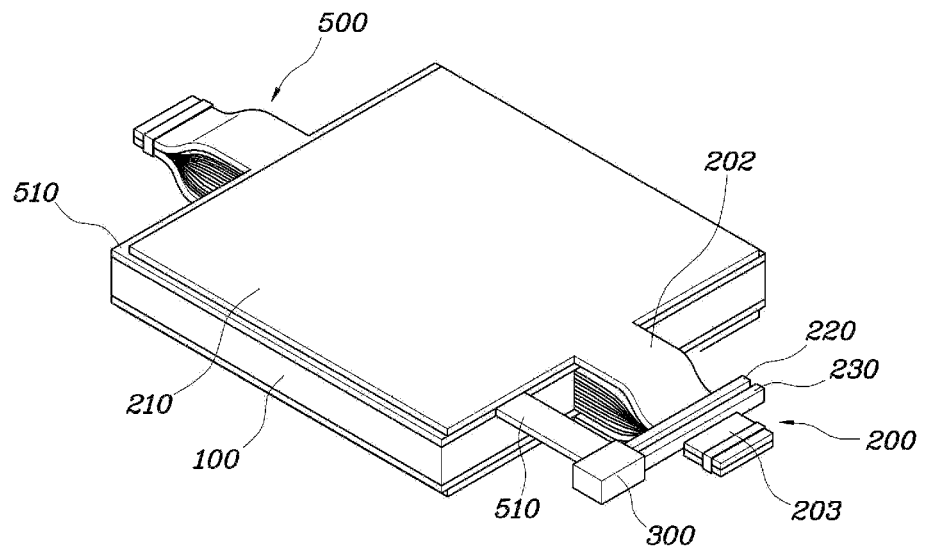
[FIG.2]
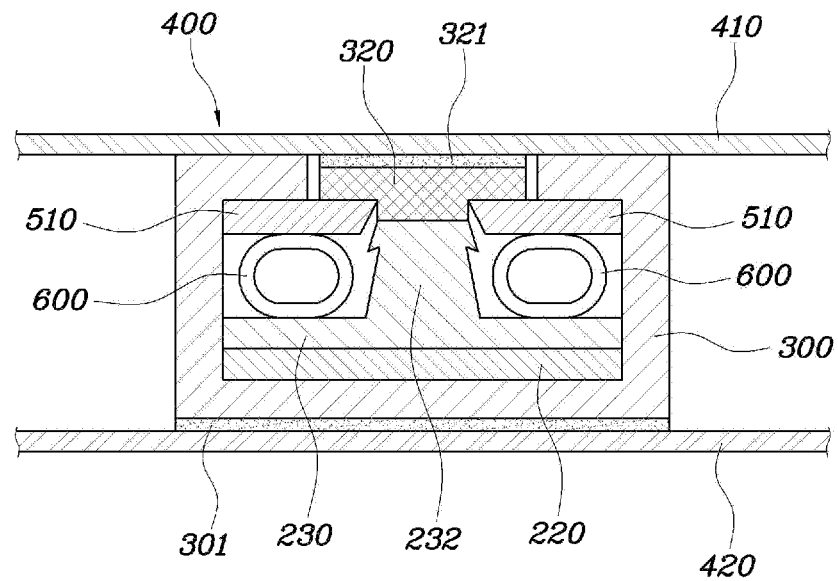

[FIG.3]
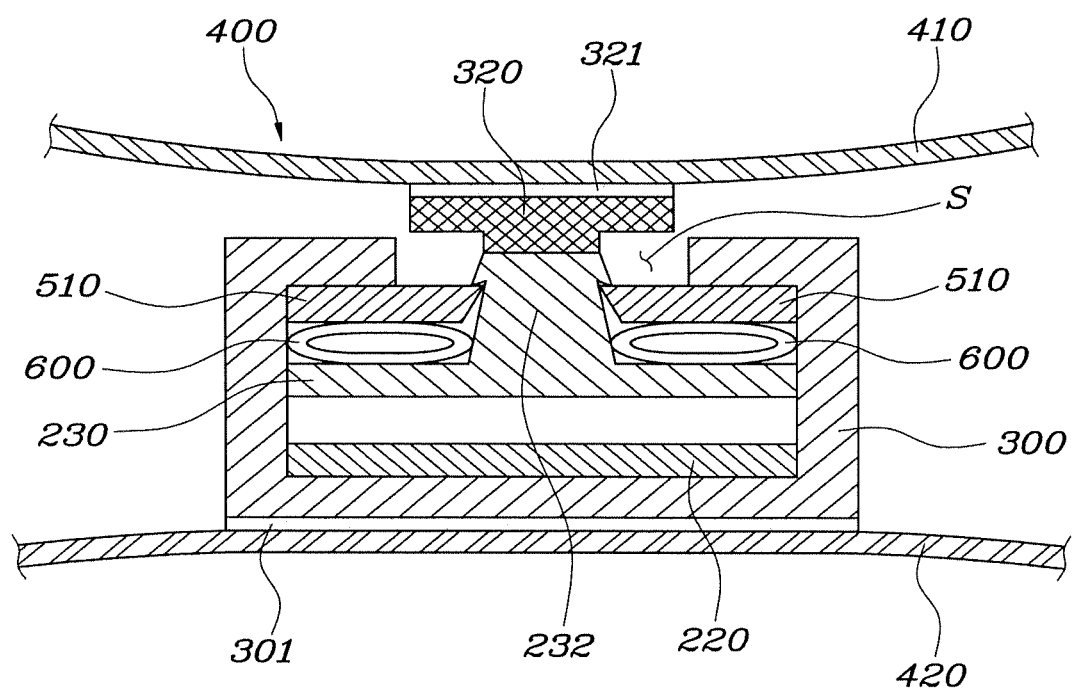
[FIG.4]
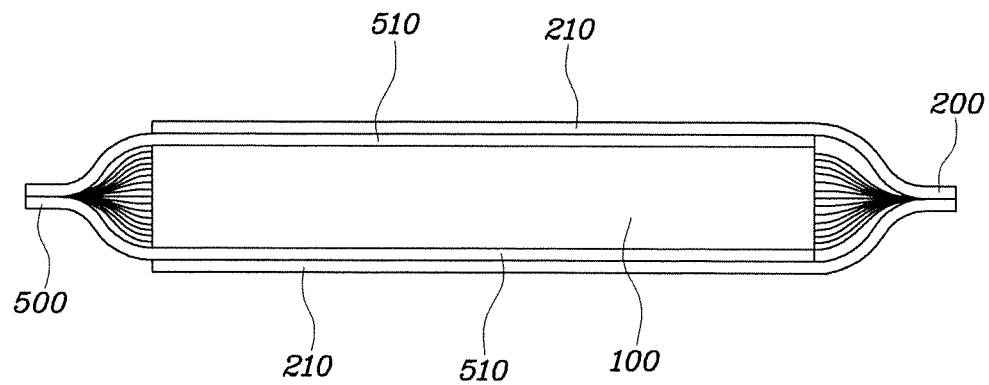

HIGH VOLTAGE BATTERY FOR VEHICLES

CROSS-REFERENCE TO RELATED APPLICATION

This application claims under 35 U.S.C. §119(a) the benefit of priority to Korean Patent Application No. 10-2013-0159574 filed on Dec. 19, 2013, the entire contents of which are incorporated herein by reference.

TECHNICAL FIELD

The present disclosure relates, in general, to a high voltage battery for vehicles which can realize safety of a pouch cell using a pouch type current interruptive device (CID, used as an overcharge safety device) having a bypass function, thereby improving marketability of batteries for vehicles.

BACKGROUND

As the application of a pouch type lithium ion secondary battery has spread in recent years, the energy density of batteries and the energy storage capacity of a unit cell have gradually increased. Particularly, to meet requirements brought from an increase in the mileage of a vehicle, it has been actively studied in recent years to increase the energy storage capacity of a lithium ion secondary battery for vehicles. However, the conventional pouch type lithium ion secondary battery is problematic in that the sheath of the battery has a low physical strength, and the battery is not provided with a cell level safety device (CID, PTC, fuse, etc.), so that it is difficult to realize desired safety of a battery having a high energy storage capacity. Particularly, when a vehicle battery is overcharged, gas is generated in the battery and the temperature inside the battery increases, such that thermal runaway may be induced in the material inside the battery which may result in a fire. Further, when an abnormal cell reaction is generated in even just one unit cell during the operation of the vehicle, an abnormal voltage may be easily induced in the battery pack, thereby reducing the driving safety of the vehicle.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. The present disclosure is intended to propose a high voltage battery for vehicles, which can realize safety of a pouch cell using a pouch type current interruptive device (CID, used as an overcharge safety device) having a bypass function, thereby improving marketability of batteries for the vehicles.

According to an exemplary embodiment of the present disclosure, a high voltage battery for vehicles includes an anode tab that is divided into a first part placed near a battery cell and a second part placed near a terminal. A first part extension extends from the first part and is fixed to a lower pouch. A second part extension extends from the second part, comes into contact with the first part extension, and is fixed at an upper end thereof to an upper pouch. A cathode extension extends from a cathode tab and is spaced apart from the upper end of the second part extension. A cushion is interposed between the second part extension and the cathode extension, with a reference level of pressure formed in the cushion.

The space between the upper pouch and the lower pouch may be vacuumized.

When the battery cell is expanded, the space between the upper pouch and the lower pouch may expand, and the second part extension may move apart from the first part extension and may come into contact with the cathode extension while compressing the cushion.

The high voltage battery for vehicles according to the present disclosure may further include a housing that envelops the first part extension, the second part extension, the cushion and the cathode extension.

The first part extension and the second part extension may be seated in a lower part of the housing, the cathode extension may be seated in an upper part of the housing, and the cushion may be interposed between the second part extension and the cathode extension.

A central portion of the second part extension may protrude upward and may be fixed to a central portion of the upper part of the housing, and the central portion of the upper part of the housing may be fixed to the upper pouch in a state of being slit.

The cathode extension and the cushion may be shaped in such a way that the cathode extension and the cushion are divided into two sides based on the protruding central portion of the second part extension.

The cathode extension may have a panel shape that covers the battery cell, wherein a first end of the cathode extension may be connected to the cathode tab and a second end of the anode extension may be spaced apart from the upper end of the second part extension.

The high voltage battery for vehicles according to the present disclosure may further include an anode extension that has a panel shape and comes into surface contact with the cathode extension, wherein one end of the anode extension is connected to the anode tab.

In the present disclosure, the anode extension or the cathode extension may be made of aluminum and the contact surface of the cathode extension or of the anode extension may be anodized.

In the present disclosure, the cathode extension may be made of copper, the anode extension may be made of aluminum, and the contact surface of the anode extension which comes into contact with the cathode extension may be anodized.

According to another exemplary of the present disclosure, a high voltage battery for vehicles includes a cathode tab that is divided into a first part placed near a battery cell and a second part placed near a terminal. A first part extension extends from the first part and is fixed to a lower pouch. A second part extension extends from the second part, comes into contact with the first part extension, and is fixed at an upper end thereof to an upper pouch. An anode extension extends from an anode tab and is spaced apart from the upper end of the second part extension. A cushion is interposed between the second part extension and the anode extension, with a reference level of pressure formed in the cushion.

The high voltage battery for vehicles which has the above-mentioned construction has advantages. When the volume of a battery cell is abnormally expanded and a variation in the pressure inside the cell is induced, the circuit of the battery is physically shorted at a pressure equal to or higher than a predetermined level. Therefore, an external electric current is interrupted, and the circuit is bypassed, and thus the present disclosure can realize cell level safety and pack voltage safety.

Unlike the conventional pouch type battery, in which, to avoid overcharge, a safety device designed to be limitedly used in a unit of module or package pack is used, the present disclosure provides an overcharge safety device that can realize cell level safety in a unit cell, and can interrupt an abnormal cell reaction in unit cells.

Further, the present disclosure adds an overcharge safety device in a surplus space between a jelly roll and a lead tab inside a pouch type unit cell, thereby realizing cell level safety regardless of module type batteries or pack package type batteries.

In the present disclosure, an abnormal internal short circuit induced by a penetration through the pouch cell is bypassed in the form of an internal short circuit inside a metal plate by a functional safety plate, thereby restricting the igniting of an electrode material and realizing cell level safety.

In addition, the present disclosure increases the physical strength of a pouch type battery, thereby improving the assembly efficiency and durability of the cell.

Further, when the temperature inside the battery cell is increased by an internal reaction of the cell, the present disclosure can efficiently dissipate heat using the metal plate.

BRIEF DESCRIPTION OF THE DRAWINGS

The above and other objects, features and other advantages of the present disclosure will be more clearly understood from the following detailed description when taken in conjunction with the accompanying drawings.

FIG. 1 is a perspective view illustrating a high voltage battery for vehicles according to an embodiment of the present disclosure.

FIGS. 2 and 3 are sectional views illustrating an operation of a high voltage battery for vehicles according to an embodiment of the present disclosure.

FIG. 4 is a sectional view illustrating a high voltage battery for vehicles according to an embodiment of the present disclosure.

DETAILED DESCRIPTION

Hereinbelow, an exemplary embodiment of the present disclosure will be described in detail with reference to the accompanying drawings.

FIG. 1 is a view illustrating a high voltage battery for vehicles according to an embodiment of the present disclosure. FIGS. 2 and 3 are views illustrating the operation of the high voltage battery for vehicles according to an embodiment of the present disclosure. FIG. 4 is a sectional view illustrating a high voltage battery for vehicles according to an embodiment of the present disclosure.

The present disclosure is provided so as to realize both cell level safety of a pouch cell and driving safety of a vehicle. In the present disclosure, to realize the cell level safety, a current interruptive device (CID, used as an overcharge safety device) capable of interrupting an electric current so as to prevent overcharge-induced igniting of the battery is used. Further, to realize penetration safety, a functional safety plate is used. In addition, to realize the driving safety, a 3-way CID is used to bypass a current flow that has been interrupted due to an abnormal cell reaction through the functional safety plate, thereby preventing an interruption of a battery pack operating voltage which may be induced by a short circuit. Accordingly, the present disclosure realizes safety of a pouch cell using a pouch type CID having a bypass function, thereby improving marketability of batteries for vehicles.

As shown in FIGS. 1 and 2, a high voltage battery for vehicles according to the present disclosure includes an anode tab 200 that is divided into a first part 202 placed near a battery cell and a second part 203 placed near a terminal (not shown). A first part extension 220 extends from the first part 202 and is fixed to a lower pouch 420. A second part extension 230 extends from the second part 203, comes into contact with the first part extension 220, and is fixed at an upper end thereof to an upper pouch 410. A cathode extension 510 extends from a cathode tab 500 and is spaced apart from the upper end of the second part extension 230. A cushion 600 is interposed between the second part extension 230 and the cathode extension 510, with a reference level of pressure formed in the cushion 600.

The CID of the present disclosure is a 3-way CID that is operated by a pressure ball. The 3-way CID is provided with three circuits: an anode connector; an anode jelly roll connector; and a cathode connector. In a normal cell state, an anode is connected to an anode jelly roll due to an expansion force of the pressure ball. However, in an abnormal cell state, gas is generated in a pouch and increases the internal pressure of the pouch, so that the pressure ball is shrunk and the pouch is expanded, thereby connecting the anode to a cathode and interrupting the electric current flowing through the pouch jelly roll.

Functional safety plates, which have a laminated structure comprising an aluminum layer that is connected to the anode and has an anodized surface and a copper layer that is connected to the cathode, are formed at upper and lower sides of the jelly roll. Thus, when the battery is accidentally penetrated, a short circuit path is formed by the anode and cathode metal plates, thereby discharging energy from the battery cell and preventing penetration-induced igniting of the battery. Further, when the 3-way CID is operated, the functional safety plates form a metal circuit that connects the anode and the cathode to each other.

Specifically, as shown in FIG. 2, the anode tab 200 of the present disclosure is divided into the first part 202 that is placed near the battery cell and the second part 203 that is placed near the terminal.

The first part extension 220 extends from the first part 202 and is fixed to the lower pouch 420. The second part extension 230 extends from the second part 203 and comes into contact with the first part extension 220, and is fixed at the upper end thereof to the upper pouch 410.

The cathode extension 510 extends from the cathode tab 500 and is spaced apart from the upper end of the second part extension 230. Further, the cushion 600 is interposed between the second part extension 230 and the cathode extension 510, with a reference level of pressure formed in the cushion 600.

The space between the upper pouch 410 and a lower pouch 420 that constitutes the pouch 400 may be vacuumized. Further, a housing 300 envelops the first part extension 220, the second part extension 230, the cushion 600 and the cathode extension 510. Here, the housing 300 is also interposed between the upper pouch 410 and the lower pouch 420. The lower end of the housing 300 is bonded to the inner surface of the lower pouch 420 at a junction 301, and the upper end of the housing 300 is bonded to the inner surface of the upper pouch 410 at a junction 321.

Further, the first part extension 220 and the second part extension 230 are seated in the lower part of the housing 300, and the cathode extension 510 is seated in the upper part of the housing 300, with the cushion 600 interposed between the second part extension 230 and the cathode extension 510. In addition, a central portion 232 of the second part extension 230 protrudes upward and is fixed to the central portion 320 of the upper part of the housing 300, and the central portion 320 of the upper part of the housing 300 is fixed to the upper pouch 410 in a slit state. The cathode extension 510 and the cushion 600 are shaped in the same manner, such that they are divided into both sides based on the protruding central portion 232 of the second part extension 230.

In a normal state, the space between the upper pouch 410 and the lower pouch 420 is vacuumized, and the first part extension 220 and the second part extension 230 come into contact with each other by an internal pressure of the cushion 600, and thus, the circuit of the battery cell 100 can be functioned normally.

However, when the battery cell 100 is expanded as shown in FIG. 3, gas is generated in the space between the upper pouch 410 and the lower pouch 420, such that the space is expanded. In the above state, the second part extension 230 is separated from the first part extension 220 and is brought into contact with the cathode extension 510 while compressing the cushion 600. Accordingly, a bypass is formed from the anode tab 200 to the cathode tab 500 without passing the battery cell 100, so that the battery is no further overcharged.

In the present disclosure, locations of the elements mounted to anode and cathode may be exchanged with each other. Described in detail, in another embodiment of the present disclosure, the high voltage battery for vehicles may include a cathode tab that is divided into a first part placed near a battery cell and a second part placed near a terminal. A first part extension extends from the first part and is fixed to a lower pouch. A second part extension extends from the second part, comes into contact with the first part extension, and is fixed at an upper end thereof to an upper pouch. An anode extension extends from an anode tab and is spaced apart from the upper end of the second part extension. A cushion is interposed between the second part extension and the anode extension, with a reference level of pressure formed in the cushion.

As shown in FIGS. 1 and 4, the cathode extension 510 may have a panel shape that covers the battery cell, wherein a first end of the cathode extension 510 may be connected to the cathode tab 500, and a second end of the cathode extension 510 may be spaced apart from the upper end of the second part extension 230.

The high voltage battery for vehicles according to the present disclosure further includes an anode extension 210 that has a panel shape and comes into surface contact with the cathode extension 510, wherein one end of the anode extension 210 is connected to the anode tab 200. Further, the cathode extension 510 or the anode extension 210 may be made of aluminum, and the contact surface of the cathode extension 510 or of the anode extension 210 may be anodized. Specifically, the cathode extension 510 may be made of copper, the anode extension 210 may be made of aluminum, and the contact surface of the anode extension 210 which comes into contact with the cathode extension 510 may be anodized.

According to the above-mentioned construction, when an object unexpectedly penetrates the battery cell 100, electricity is conducted through copper and aluminum of the cathode extension 510 and the anode extension 210 which have been normally insulated from each other due to anodization, so a bypass is formed from the cathode extension 510 to the anode extension 210 while bypassing and insulating the battery cell 100.

The high voltage battery for vehicles which has the above-mentioned construction has advantages. When the volume of a battery cell is abnormally expanded, and a variation in the pressure inside the cell is induced, the circuit of the battery is physically shorted at a pressure equal to or higher than a reference level, thereby interrupting an external electric current and bypassing the circuit, and thus, the present disclosure can realize cell level safety and pack voltage safety.

Unlike the conventional pouch type battery, in which, to avoid overcharge, a safety device designed to be limitedly used in the unit of module or package pack is used, the present disclosure provides an overcharge safety device that can realize cell level safety in a unit cell, and can interrupt an abnormal cell reaction in unit cells.

Further, the present disclosure adds an overcharge safety device in a surplus space between a jelly roll and a lead tab inside a pouch type unit cell, thereby realizing cell level safety regardless of module type batteries or pack package type batteries.

In the present disclosure, an abnormal internal short circuit induced by a penetration through the pouch cell is bypassed in the form of an internal short circuit inside a metal plate by a functional safety plate, thereby restricting igniting of an electrode material and realizing cell level safety.

In addition, the present disclosure increases the physical strength of a pouch type battery, thereby improving the assembly efficiency and durability of the cell.

Further, when the temperature inside the battery cell is increased by an internal reaction of the cell, the present disclosure can efficiently dissipate heat using the metal plate.

Although an exemplary embodiment of the present disclosure has been described for illustrative purposes, those skilled in the art will appreciate that various modifications, additions, and substitutions are possible, without departing from the scope and spirit of the disclosure as disclosed in the accompanying claims.

What is claimed is:

1. A high voltage battery for vehicles, comprising:
an anode tab that is divided into a first part and a second part;
a first part extension that extends from the first part and is fixed to a lower pouch;
a second part extension that extends from the second part, comes into contact with part extension, and is fixed at an upper end thereof to an upper pouch;
a cathode extension that extends from a cathode tab and is spaced apart from the upper end of the second part extension; and
a cushion that is interposed between the second part extension and the cathode extension, with a reference level of pressure formed in the cushion,
wherein when the battery is expanded, a space between the upper pouch and the lower pouch expands, and the second part extension moves apart from the first part extension and comes into contact with the cathode extension while compressing the cushion.

2. The high voltage battery for vehicles as set forth in claim 1, wherein the space between the upper pouch and the lower pouch is vacuumized.

3. The high voltage battery for vehicles as set forth in claim 1, further comprising:

a housing that envelops the first part extension, the second part extension, the cushion and the cathode extension.

4. The high voltage battery for vehicles as set forth in claim 3, wherein the first part extension and the second part extension are seated in a lower part of the housing, the cathode extension is seated in an upper part of the housing, and the cushion is interposed between the second part extension and the cathode extension.

5. The high voltage battery for vehicles as set forth in claim 4, wherein a central portion of the second part extension protrudes upward and is fixed to a central portion of the upper part of the housing, and the central portion of the upper part is fixed to the upper pouch in which the housing has a slit at the central portion of the upper part thereof.

6. The high voltage battery for vehicles as set forth in claim 5, wherein the cathode extension and the cushion are shaped in such a way that the cathode extension and the cushion are divided into two sides based on the protruding central portion of the second part extension.

7. The high voltage battery for vehicles as set forth in claim 1, wherein the cathode extension has a panel shape that covers the battery cell, wherein a first end of the cathode extension is connected to the cathode tab and a second end of the cathode extension is spaced apart from the upper end of the second part extension.

8. The high voltage battery for vehicles as set forth in claim 7, further comprising:
an anode extension that has a panel shape and comes into surface contact with the cathode extension, wherein one end of the anode extension is connected to the anode tab.

9. The high voltage battery for vehicles as set forth in claim 8, wherein the cathode extension or the anode extension is made of aluminum and the contact surface of the cathode extension or of the anode extension is anodized.

10. The high voltage battery for vehicles as set forth in claim 8, wherein the cathode extension is made of copper, the anode extension is made of aluminum, and the contact surface of the anode extension which comes into contact with the cathode extension is anodized.

11. A high voltage battery for vehicles, comprising:
a cathode tab that is divided into a first part and a second part;
a first part extension that extends from the first part and is fixed to a lower pouch;
a second part extension that extends from the second part, comes into contact with the first part extension, and is fixed at an upper end thereof to an upper pouch;
an anode extension that extends from an anode tab and is spaced apart from the upper end of the second part extension; and
a cushion that is interposed between the second part extension and the anode extension, with a reference level of pressure formed in the cushion,
wherein when the battery is expanded, a space between the upper pouch and the lower pouch expands, and the second part extension moves apart from the first part extension and comes into contact with the cathode extension while compressing the cushion.

* * * * *